(12) United States Patent
Lee (10) Patent No.: US 8,451,412 B2
(45) Date of Patent: May 28, 2013

(54) LIQUID CRYSTAL DISPLAY DEVICE OF IN-PLANE SWITCHING MODE

(75) Inventor: Jae Kwang Lee, Daegu (KR)

(73) Assignee: LG Display Co. Ltd., Seoul (KR)

( * ) Notice: Subject to any disclaimer, the term of this patent is extended or adjusted under 35 U.S.C. 154(b) by 703 days.

(21) Appl. No.: 12/579,769

(22) Filed: Oct. 15, 2009

(65) Prior Publication Data

US 2010/0141884 A1    Jun. 10, 2010

(30) Foreign Application Priority Data

Dec. 8, 2008 (KR) .......................... 10-2008-0123933

(51) Int. Cl.
*G02F 1/1343* (2006.01)
(52) U.S. Cl.
USPC .............................. 349/141; 349/39; 349/139
(58) Field of Classification Search
USPC ...................................... 349/38, 39, 139, 141
See application file for complete search history.

(56) References Cited

U.S. PATENT DOCUMENTS

2006/0145990 A1* 7/2006 Kim et al. ........................ 345/94

* cited by examiner

*Primary Examiner* — Edward Glick
*Assistant Examiner* — David Chung
(74) *Attorney, Agent, or Firm* — Brinks Hofer Gilson & Lione (57) ABSTRACT

An IPS mode LCD device with an improved aperture ratio is disclosed. The IPS mode LCD device includes: gate lines and data lines configured to cross each other and to define first and second pixel regions arranged to alternate with each other; a thin film transistor formed at each intersection of the gate and data lines and configured to include a source electrode extended from the data line, a drain electrode separated from the source electrode, and a gate electrode extended from the gate line; a pixel electrode configured to include a pixel electrode lead portion connected to the drain electrode, a pixel electrode connection bar extended from the pixel electrode lead portion, and a plurality of pixel electrode protrusions extended from the pixel electrode connection bar; common lines arranged to be separated parallel to the gate lines; and a common electrode configured to include a common electrode connection bar connected to the common line, and a plurality of common electrode protrusions extended from the common electrode connection bar and arranged to alternate with the pixel electrode protrusions. At least one of the first and second pixel regions is configured to include upper and lower portions in which the pixel electrode protrusions and the common electrode protrusions are arranged in different numbers.

9 Claims, 11 Drawing Sheets

LIQUID CRYSTAL DISPLAY DEVICE OF IN-PLANE SWITCHING MODE

This application claims the benefit of Korea Patent Application No. 10-2008-0123933 filed on Dec. 8, 2008, the entire contents of which is incorporated herein by reference for all purposes as if fully set forth herein.

BACKGROUND

1. Field of the Invention

This disclosure relates to a liquid crystal display (LCD) device, and more particularly to an LCD device of an in-plane switching (IPS) mode.

2. Discussion of the Related Art

Recently, LCD devices of an IPS mode have been developed which improve a viewing angle of the image. The IPS mode LCD device controls the directional alignment of liquid crystal molecules by the induction of an in-plane (or a horizontal) electric field between two electrodes formed on one substrate. Such an IPS mode LCD device will now be described referring to the attached drawings.

Figure 1:
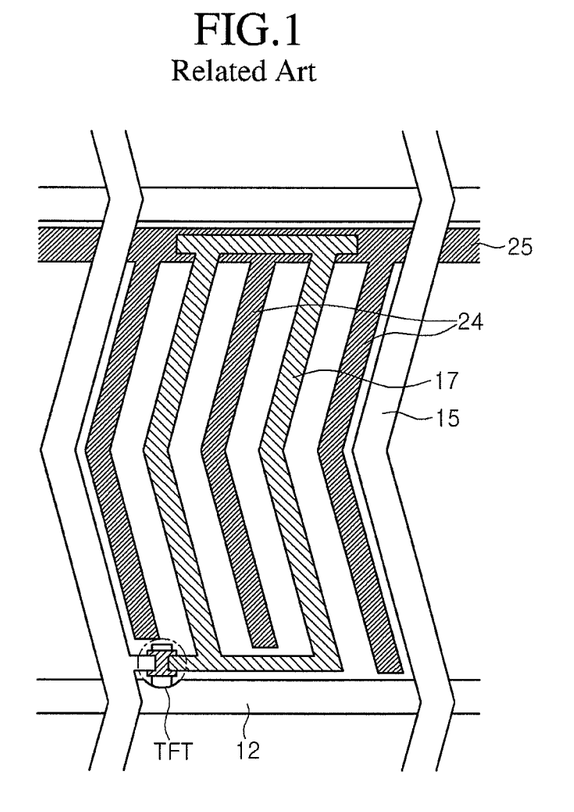
FIG. 1 is a planar view showing an LCD device of an IPS mode according to the related art.

FIG. 1 is a planar view showing an IPS mode LCD device according to the related art. As shown in FIG. 1, an IPS mode LCD device includes gate lines 12 and data lines 15 crossing each other perpendicularly and defining pixels on a substrate, thin film transistors formed at each intersection of the gate and data lines 12 and 15, as well as common electrodes 24 and pixel electrodes 17 alternating with each other in a parallel line within each pixel and inducing a horizontal electric field. The common electrodes 24 are formed in a united body along with a common line 25 which is parallel to the gate lines 12. The common electrodes 24 receive a voltage from outside the active area.

The IPS mode LCD device of such a configuration applies voltages to the common electrode 25 and the pixel electrode 17, both of which are formed on a same substrate, thereby inducing an in-plane electric field on the substrate in a horizontal direction. The in-plane electric field rotates liquid crystal molecules, causing them to maintain a horizontal state with respect to the substrate.

However, as the pixel electrode 24 and the common electrode 17 are arranged parallel to the data lines 15 (or along the direction of the data lines 15), the area of the pixel region occupied by the pixel and common electrode 24 and 17 is enlarged. Therefore, the aperture ratio of the IPS mode LCD device deteriorates.

BRIEF SUMMARY

An IPS mode LCD device includes: gate lines and data lines configured to cross each other and to define first and second pixel regions arranged to alternate with each other; a thin film transistor formed at each intersection of the gate and data lines and configured to include a source electrode extended from the data line, a drain electrode separated from the source electrode, and a gate electrode extended from the gate line; a pixel electrode configured to include a pixel electrode lead portion connected to the drain electrode, a pixel electrode connection bar extended from the pixel electrode lead portion, and a plurality of pixel electrode protrusions extended from the pixel electrode connection bar; common lines arranged to be separated parallel to the gate lines; and a common electrode configured to include a common electrode connection bar connected to the common line, and a plurality of common electrode protrusions extended from the common electrode connection bar and arranged to alternate with the pixel electrode protrusions. At least one of the first and second pixel regions is configured to include upper and lower portions in which the pixel electrode protrusions and the common electrode protrusions are arranged in different numbers.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings.

Wherever possible, the same reference numbers will be used throughout this disclosure including the drawings to refer to the same or like parts.

Figure 2:
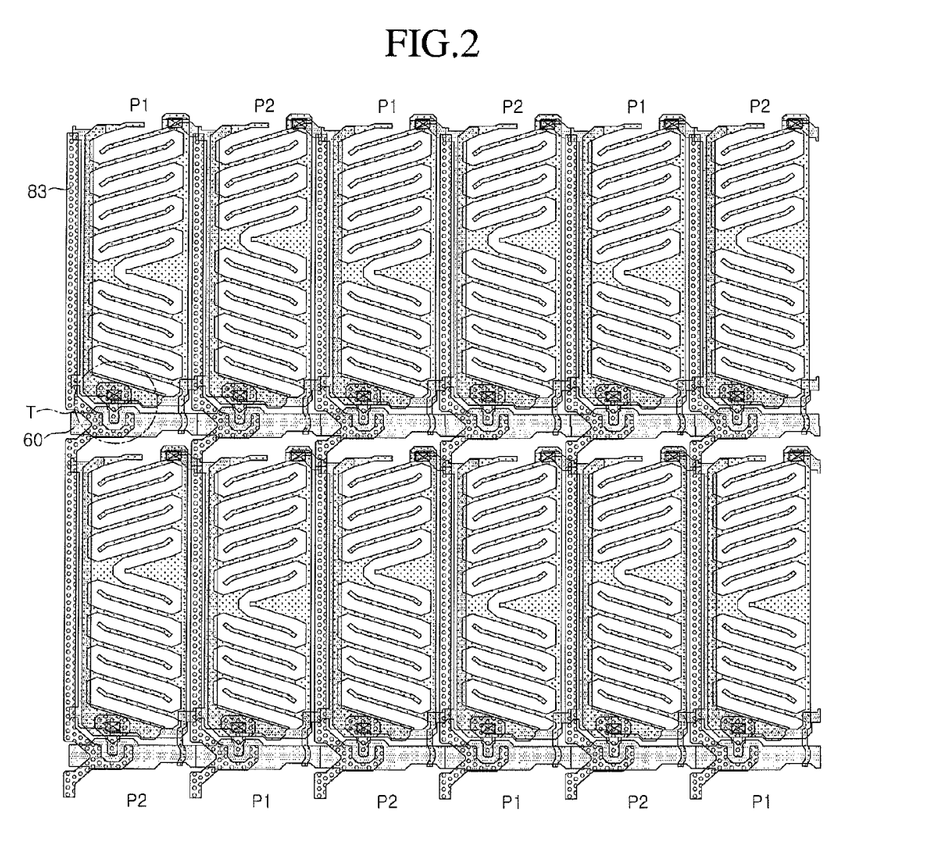
FIG. 2 is a planar view showing an LCD device of an IPS mode according to an embodiment of the present disclosure.

FIG. 2 is a planar view showing an LCD device of an IPS mode according to an embodiment of the present disclosure. Referring to FIG. 2, an IPS mode LCD device according to an embodiment of the present disclosure includes gate lines arranged in one direction, data lines 70 arranged to cross the gate lines 60 perpendicularly, and a thin film transistor T disposed at each intersection of the gate and data lines 60 and 70. The crossing of the gate lines 60 and the data lines 70 defines first pixel regions P1 and second pixel regions P2. The first and second pixel regions P1 and P2 are arranged to alternate each other. Such first and second pixel regions P1 and P2 will be described referring to FIGS. 3A and 3B.

Figure 3A:
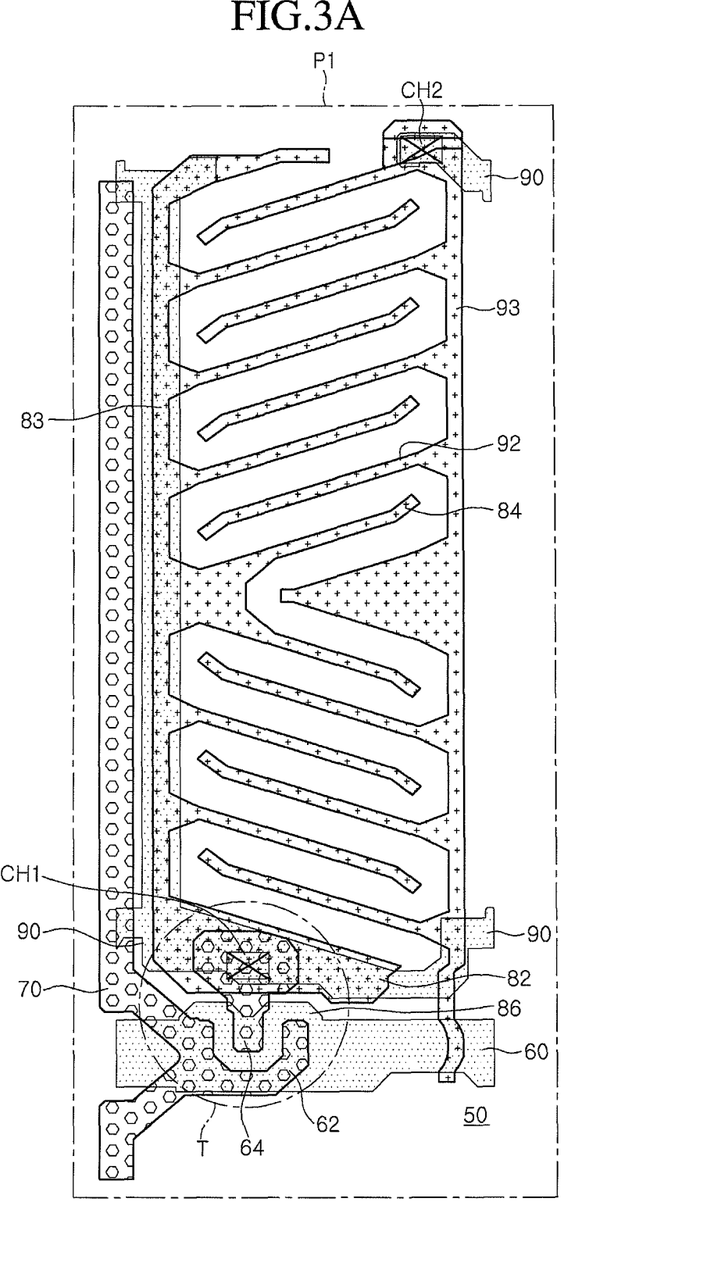
FIGS. 3A and 3B are planar views showing first and second pixel regions of an IPS mode LCD device according to an embodiment of the present disclosure.

FIG. 3A is an enlarged planar view showing a first pixel region of the IPS mode LCD device according to an embodiment of the present disclosure. As shown in FIG. 3A, a substrate 50 is configured to include a gate line 60 extended in one direction, a data line 70 disposed to cross the gate line 60 and to define a first pixel region P1, and a thin film transistor T disposed at the intersection of the gate line 60 and the data line 70.

The thin film transistor T includes a gate electrode 86 from the gate line 60, a source electrode 62 connected to the data line 70 and formed in a "U" shape, and a drain electrode 64 separated from the source electrode 62. The thin film transistor T further includes a pure amorphous silicon layer (not shown) and a doped amorphous silicon layer (not shown) stacked between the gate electrode 86 and the source/drain electrodes 62 and 64.

A pixel electrode is provided on the first pixel region P1. The pixel electrode is configured to include a pixel electrode lead portion 82, a pixel electrode connection bar 83, and a plurality of pixel electrode protrusions 84. The pixel electrode lead portion 82 is connected to the drain electrode 64 through a drain contact hole CH1. The pixel electrode connection bar 83 is separated from the data line 70 and extends from the pixel electrode lead portion 82 parallel to the data line 70. The plurality of pixel electrode protrusions 84 project in a finger shape from the pixel electrode connection bar 83 and are separated from one another.

Also, a common electrode is provided on the first pixel region P1. The common electrode is configured to include a plurality of common electrode protrusions 92 arranged to engage with the plurality of the pixel electrode protrusions 84, as well as a common electrode connection bar 93 connected to the plurality of the common electrode protrusions 82. The common electrode connection portion 93 is formed parallel to but separate from the data line 70. A common line 90 is connected to one end of the common electrode connection bar 93 through a common contact hole CH2. The common line 90 extends in two perpendicular directions, parallel to the gate line 60 and the data line 70. In other words, the common line 90 is formed in an "L" shape which extends along the outline of the first pixel region P1 and is separated from the gate line 60 and the data line 70.

The ends of the pixel electrode protrusions 84 positioned on the right-upper and right-lower portions of the first pixel region P1 as well as the connection portions of the common electrode protrusions 92 and the common electrode connection bar 93 diagonally adjacent to the ends of the pixel electrode protrusions 84 are formed in a diagonal incline.

The pixel electrode protrusions 84 on the upper portion of the first pixel region P1 are formed to angle upward, while the pixel electrode protrusions 84 on the lower portion of the first pixel region P1 are formed to angle downward. As such, the ends of the pixel electrode protrusions 84 on the upper portion of the first pixel region P1 are upwardly bent toward the corners of the upwardly adjacent common electrode protrusions 92 and the common electrode connection bar 93, while the ends of the pixel electrode protrusions 84 on the lower portion of the first pixel region P1 are bent toward corners of the downwardly adjacent common electrode protrusions 92 and the common electrode connection bar 93. In other words, the pixel electrode protrusions 84 on the upper portion of the first pixel region P1 are formed symmetrically with those on the lower portion of the first pixel region P1.

On the contrary, the common electrode protrusions 92 on the upper portion of the first pixel region P1 are formed to angle downward, while the common electrode protrusions 92 on the lower portion of the first pixel region P1 are formed to angle upward. As such, the ends of the common electrode protrusions 92 on the upper portion of the first pixel region P1 are downwardly bent toward the corners of the downwardly adjacent pixel electrode protrusions 84 and the pixel electrode connection bar 83, while the ends of the common electrode protrusions 92 on the lower portion of the first pixel region P1 are upwardly bent toward the corners of the upwardly adjacent pixel electrode protrusions 84 and the pixel electrode connection bar 83. To rectify this, the common electrode protrusions 92 on the upper portion of the first pixel region P1 are formed symmetrically with those on the lower portion of the first pixel region P1.

In this manner, the pixel electrode protrusions 84 and the common electrode protrusions 92 on the upper portion of the first pixel region P1 are formed symmetrically with those on the lower portion of the first pixel region P1.

The pixel electrode protrusions 84 and the common electrode protrusions 92 on an upper portion of the first pixel region P1 are arranged in a greater number compared with those on a lower portion of the first pixel region P1. For example, the number of the pixel electrode protrusions 84 and the common electrode protrusions 92 on the upper portion of the first pixel region P1 is "9", while the number of the pixel electrode protrusions 84 and the common electrode protrusions 92 on the lower portion of the first pixel region P1 is "7", as shown in FIGS. 2 and 3A. In other words, the pixel electrode protrusions 84 and the common electrode protrusions 92 are arranged in different quantities on the upper and lower portions of the first pixel region P1.

Figure 3B:
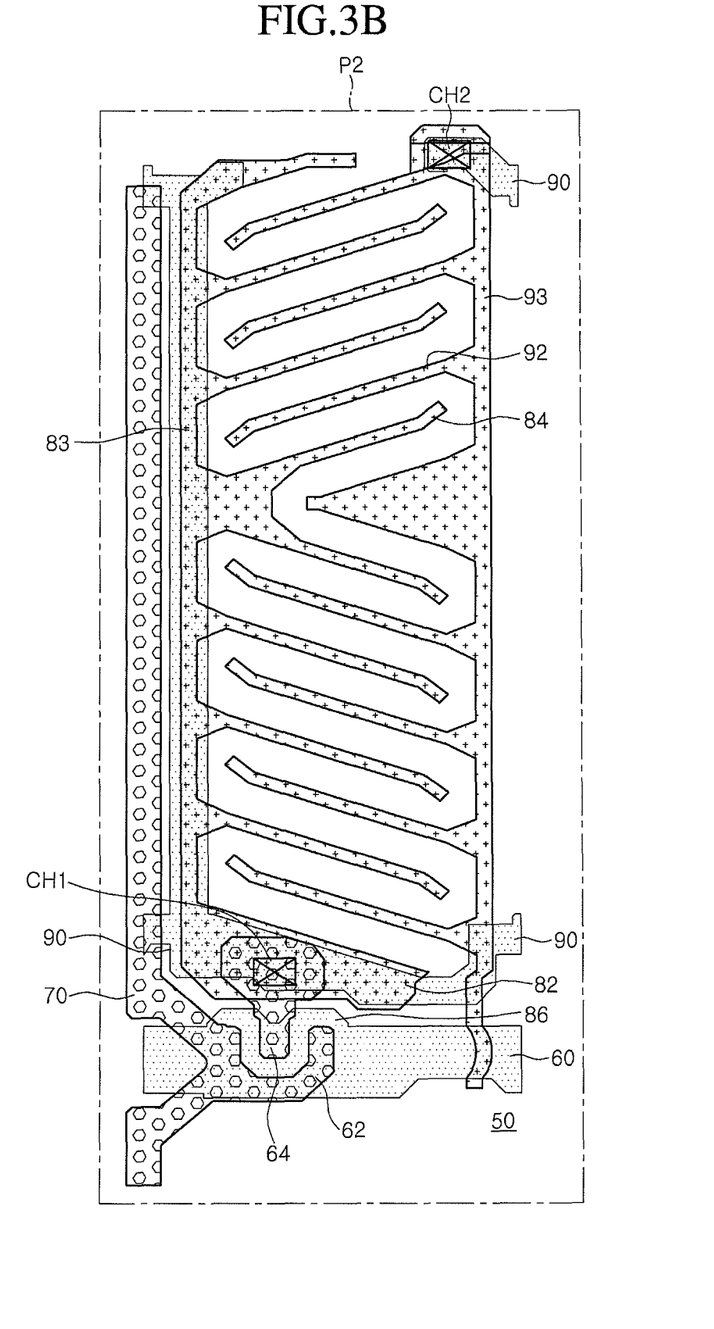

FIG. 3B is an enlarged planar view showing a second pixel region of the IPS mode LCD device according to an embodiment of the present disclosure. The second pixel region P2 shown in FIG. 3B is provided with a gate line 60, a data line 70, a thin film transistor T, a pixel electrode lead portion 82, a pixel electrode connection bar 83, a plurality of pixel electrode protrusions 84, a plurality of common electrode protrusions 92, a common electrode connection bar 93, and a common line 90 which are configured in the same way as the components of the first pixel region P1 in FIG. 3A. As such, these components on the second pixel region P1 can be understood through the descriptions of FIG. 3A. Accordingly, the explanation for the components on the second pixel region P2 will be omitted.

The pixel electrode protrusions 84 and the common electrode protrusions 92 on an upper portion of the second pixel region P2 are arranged in a smaller number compared with those on a lower portion of the second pixel region P2. Actually, the number of the pixel electrode protrusions 84 and the common electrode protrusions 92 on the upper portion of the second pixel region P2 is "7", while the number of the pixel electrode protrusions 84 and the common electrode protrusions 92 on the lower portion of the second pixel region P2 is "9", as shown in FIGS. 2 and 3B. In other words, the pixel electrode protrusions 84 and the common electrode protrusions 92 are arranged in different quantities on the upper and lower portions of the second pixel region P2.

In this manner, the common electrode and the pixel electrode are arranged in the direction of the gate lines 60. As such, the area occupied by the common and pixel electrodes arranged in the direction of the gate lines 60 is narrower (or smaller) than that of the common and pixel electrodes arranged in the direction of the data lines. Therefore, the IPS mode LCD device of the present embodiment can improve its aperture ratio.

Figure 4:
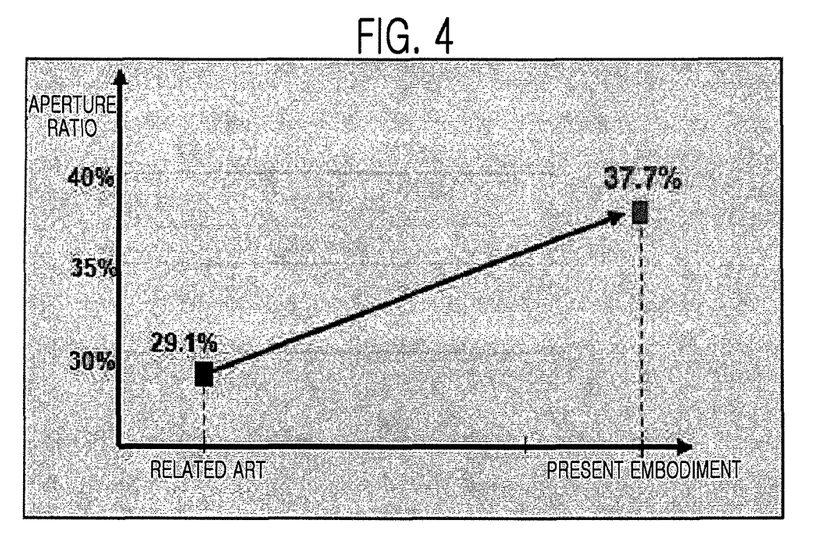
FIG. 4 is a graphic diagram showing the aperture ratio of an IPS mode LCD device according to an embodiment of the present disclosure.

Actually, as shown in FIG. 4, the IPS mode LCD device of the present disclosure with the common and pixel electrodes arranged in the direction of the gate lines has an aperture ratio of 37.7%, while the IPS mode LCD device of the related art with the common and pixel electrodes arranged in the direction of the data lines has an aperture ratio of 29.1%. Consequently, the IPS mode LCD device of the present disclosure has an increased aperture ratio in comparison with that of the related art.

Also, the IPS mode LCD device of the present embodiment forces the first and second pixel regions P1 and P2 to be arranged in an alternating pattern. Accordingly, the IPS mode LCD device of the present embodiment can minimize color shift in viewing angles of left and right diagonal directions. This feature in the IPS mode LCD device of the present embodiment will now be explained in detail.

Figure 5:
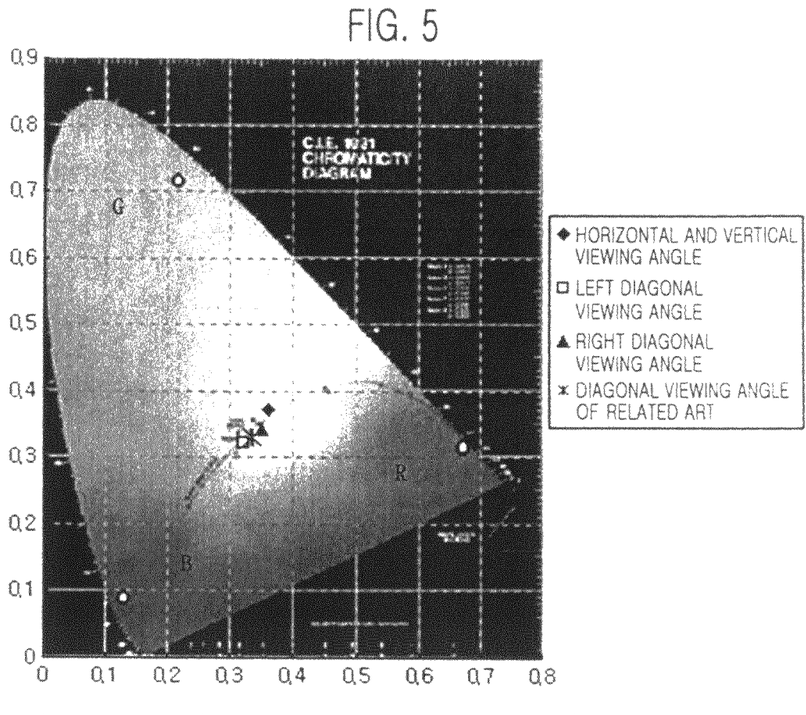
FIG. 5 is a chromatic diagram representing the color shift characteristics of an IPS mode LCD device, in which only first (or second) pixel regions are arranged, according to an embodiment of the present disclosure.

FIG. 5 is a chromatic diagram explaining the color shift characteristics of an IPS mode LCD device in which only the first pixel regions P1 (or the second pixel regions P2) are arranged. Table 1 lists color coordinates which demonstrate the color shift characteristics of an IPS mode LCD device in which only the first pixel regions P1 (or the second pixel regions P2) are arranged.

Referring to FIG. 5 and Table 1, a color position of a left diagonal viewing angle corresponds to an X-axis value of 0.3229 and a Y-axis value of 0.3219, and the color position of a right diagonal angle corresponds to an X-axis value of 0.3505 and a Y-axis value of 0.3427. The color positions of the left and right diagonal viewing angles are dispersed from the color positions of horizontal and vertical viewing angles which each have an X-axis value of 0.3600 and a Y-axis value of 0.3721. As such, the color scheme is widely represented. However, the first pixel region P1 (or the second pixel region P2), in which the pixel and common electrode protrusions 84 and 92 arranged in the upper and lower portions are of different quantities, creates a color shift phenomenon in the left diagonal viewing angle (or right diagonal viewing angle). Such a color shift phenomenon caused by the arrangement of only first pixel regions P1 (or second pixel regions P2) can be prevented by an alternate arrangement of the first and second pixel regions P1 and P2.

TABLE 1

|  | X | Y |
|---|---|---|
| Horizontal | 0.3600 | 0.3721 |
| Left diagonal | 0.3229 | 0.3219 |
| Vertical | 0.3600 | 0.3721 |
| Right diagonal | 0.3505 | 0.3427 |

Figure 6:
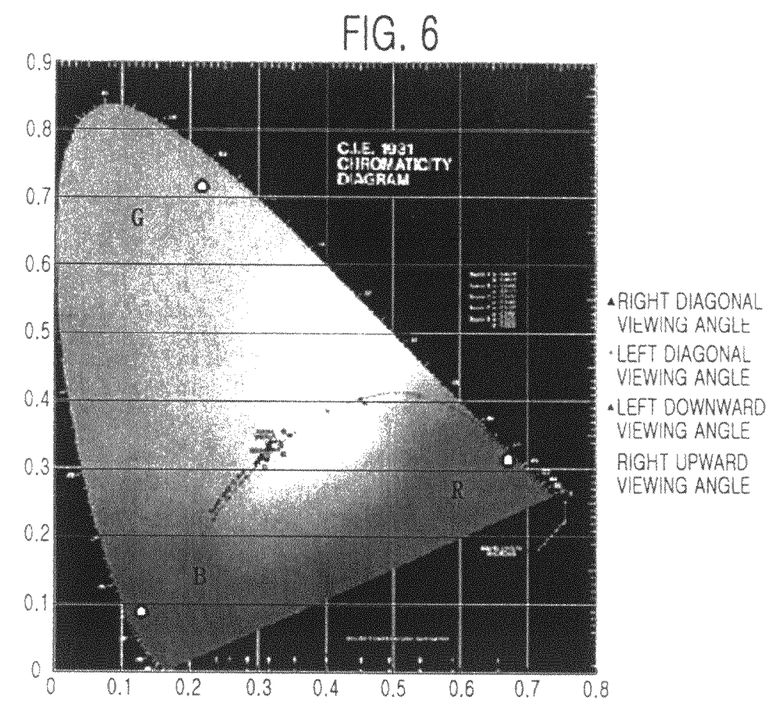
FIGS. 6 and 7 are first chromatic diagrams representing the color shift characteristics of an IPS mode LCD device, in which first and second pixel regions are arranged, according to an embodiment of the present disclosure.
Figure 7:
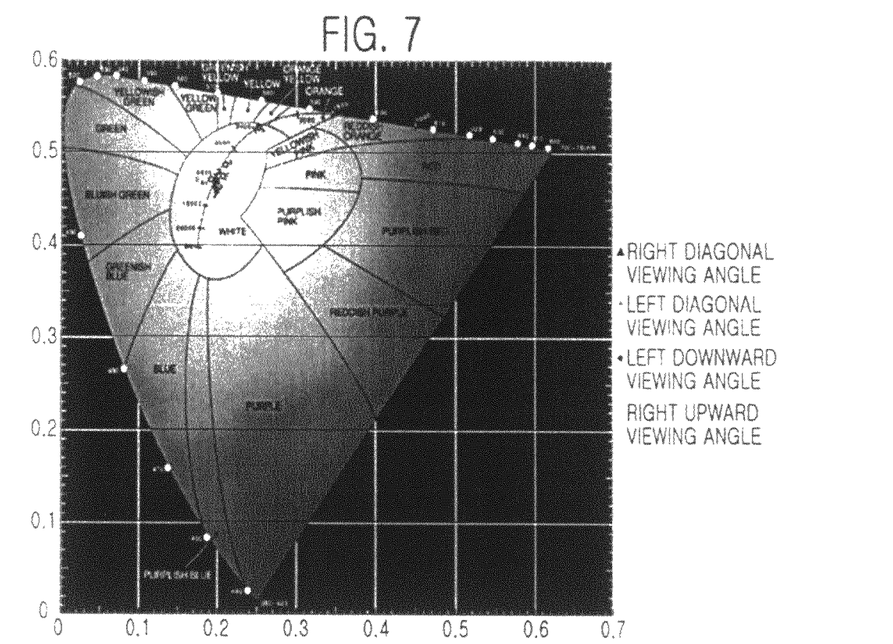

FIGS. 6 and 7 are CIE 1931 and CIE 1976 chromatic diagrams representing the color shift characteristics of an IPS mode LCD device with an alternate arrangement of first and second pixel regions P1 and P2. Tables 2 and 3 provide color positions which demonstrate the color shift characteristics of the IPS mode LCD device with an alternate arrangement of first and second pixel regions P1 and P2, from FIGS. 6 and 7.

Referring to FIG. 6 and Table 2, the color position of a left diagonal viewing angle corresponds to an X-axis value of 0.3324 and a Y-axis value of 0.3341, and the color position of a right diagonal viewing angle corresponds to an X-axis value of 0.3171 and a Y-axis value of 0.3357. The color positions of the left and right diagonal viewing angles are nearly adjacent to the color position of a left downward viewing angle, which has an X-axis value of 0.3237 and a Y-axis value of 0.3386, and to the color position of a right upward viewing angle, which has an X-axis value of 0.3235 and a Y-axis value of 0.3408. To rectify this, color is narrowly distributed.

TABLE 2

|  | X-axis | Y-axis |
|---|---|---|
| Left downward | 0.3237 | 0.3386 |
| Left diagonal | 0.3324 | 0.3341 |
| Right upward | 0.3235 | 0.3408 |
| Right diagonal | 0.3171 | 0.3357 |

The color position of a left diagonal viewing angle corresponds to a u-axis value of 0.2018 and a v-axis value of 0.4750, and the color position of a right diagonal viewing angle corresponds to a u-axis value of 0.1984 and a v-axis value of 0.4725, as seen in FIG. 7 and Table 3. The color positions of the left and right diagonal viewing angles very closely approach the color position of a left downward viewing angle, which has a u-axis value of 0.2018 and a v-axis value of 0.4750, and the color position of a right upward viewing angle, which has a u-axis value of 0.1984 and a v-axis value of 0.4725. As such, color is narrowly distributed.

TABLE 3

|  | u-axis | v-axis |
|---|---|---|
| Left downward | 0.2018 | 0.4750 |
| Left diagonal | 0.2096 | 0.4739 |
| Right upward | 0.2009 | 0.4761 |
| Right diagonal | 0.1984 | 0.4725 |

Consequently, it is evident that the alternate arrangement of the first and second pixel regions P1 and P2 prevents the color shift phenomenon at left and right diagonal viewing angles.

Figure 8:
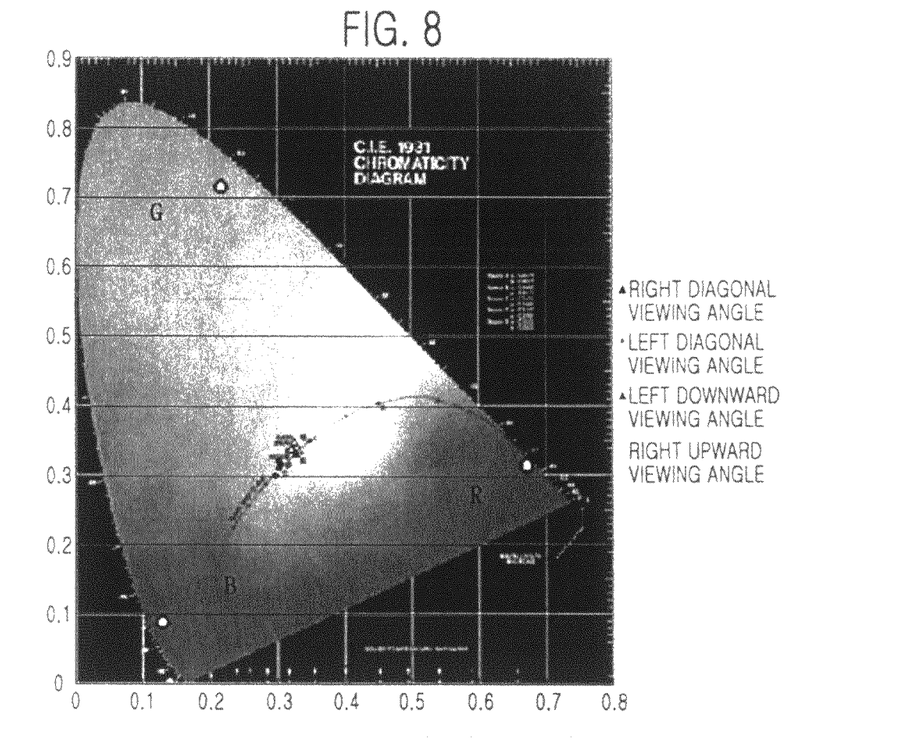
FIGS. 8 and 9 are second chromatic diagrams representing the color shift characteristics of an IPS mode LCD device, in which first and second pixel regions are arranged, according to an embodiment of the present disclosure.
Figure 9:
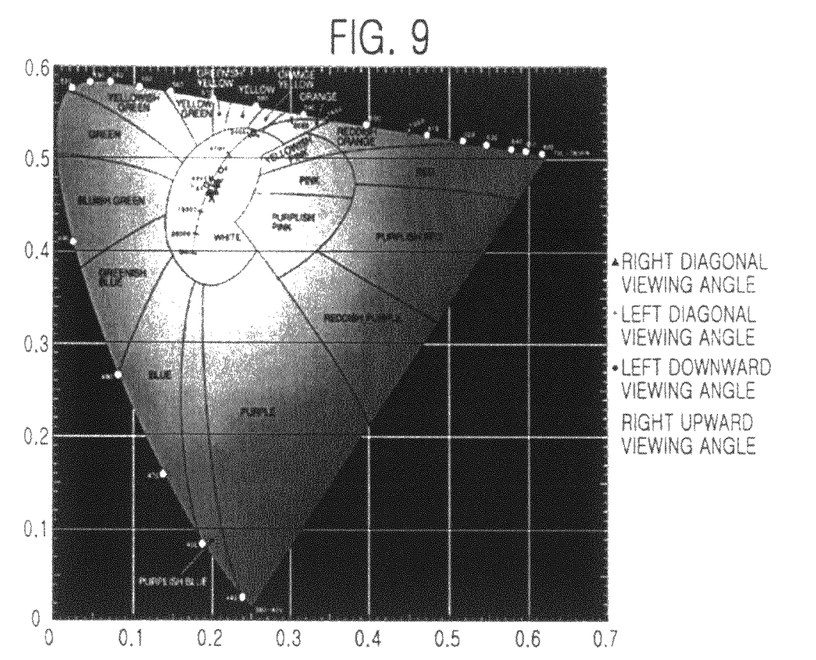

FIGS. 8 and 9 are CIE 1931 and CIE 1976 chromatic diagrams representing the color shift characteristics of the IPS mode LCD device with an alternate arrangement of first and second pixel regions P1 and P2. Tables 4 and 5 are provided with color positions, explaining the color shift characteristics of the IPS mode LCD device with an alternate arrangement of first and second pixel regions P1 and P2, from FIGS. 8 and 9. The chromatic diagrams of FIGS. 6 and 7 and the color positions in the Tables 2 and 3 were obtained by driving the first pixel regions P1 and the second pixel regions P2. The chromatic diagrams of FIGS. 8 and 9 and the color positions in the Tables 4 and 6 were obtained when only one of either the first pixel regions P1 or the second pixel regions P2 is driven.

Referring to FIG. 8 and Table 4, the color position of a left diagonal viewing angle corresponds to an X-axis value of 0.3200 and a Y-axis value of 0.3313, and the color position of a right diagonal viewing angle corresponds to an X-axis value of 0.3210 and a Y-axis value of 0.3368. The color positions of the left and right diagonal viewing angles very closely approach the color position of a left downward viewing angle, which has an X-axis value of 0.3245 and a Y-axis value of 0.3387, and to the color position of a right upward viewing angle, which has an X-axis value of 0.3223 and a Y-axis value of 0.3425. Consequently, color is narrowly distributed.

TABLE 4

|  | X-axis | Y-axis |
| --- | --- | --- |
| Left downward | 0.3245 | 0.3387 |
| Left diagonal | 0.3200 | 0.3313 |
| Right upward | 0.3223 | 0.3425 |
| Right diagonal | 0.3210 | 0.3368 |

The color position of a left diagonal viewing angle corresponds to a u-axis value of 0.2006 and a v-axis value of 0.4737, and the color position of a right diagonal viewing angle corresponds to a u-axis value of 0.2037 and a v-axis value of 0.4724, as seen in FIG. 9 and Table 5. The color positions of the left and right diagonal viewing angles very closely approach the color position of a left downward viewing angle, which has a u-axis value of 0.2024 and a v-axis value of 0.4751 and the color position of a right upward viewing angle, which has a u-axis value of 0.1994 and a v-axis value of 0.4768. As such, color is narrowly distributed.

TABLE 5

|  | u-axis | v-axis |
| --- | --- | --- |
| Left downward | 0.2024 | 0.4751 |
| Left diagonal | 0.2006 | 0.4737 |
| Right upward | 0.1994 | 0.4768 |
| Right diagonal | 0.2037 | 0.4724 |

Figure 10:
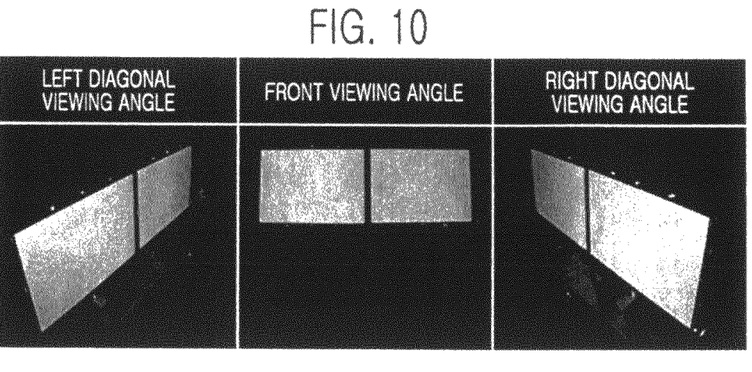
FIG. 10 is a view showing the display states of an IPS mode LCD device, namely left-diagonal, front, and right-diagonal directions, according to an embodiment of the present disclosure.

Accordingly, the alternate arrangement of the first and second pixel regions P1 and P2 can prevent the color shift phenomenon at left and right diagonal viewing angles. In comparing the display at a front viewing angle and the displays at left and right diagonal viewing angles, it is evident that the color shift phenomenon at the left and right diagonal viewing angles are minimized.

As described above, the IPS mode LCD device according to an embodiment of the present disclosure is configured to include common and pixel electrodes arranged in the direction of the gate lines. As such, the area occupied by the common and pixel electrodes which are arranged in the direction of the gate lines becomes smaller than that occupied by the related art common and pixel electrodes which are arranged in the direction of the data lines. Therefore, the IPS mode LCD device according to an embodiment of the present disclosure can improve the aperture ratio.

In addition, the IPS mode LCD device according to an embodiment of the present disclosure allows first and second pixel regions to be arranged alternating with each other, thereby preventing the color shift phenomenon which can occur at left and right diagonal viewing angles.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A liquid crystal display device of an in-plane switching mode comprising:
    gate lines and data lines configured to cross each other and to define first and second pixel regions arranged to alternate with each other;
    a thin film transistor formed at each intersection of the gate and data lines and configured to include a source electrode extended from the data line, a drain electrode separated from the source electrode, and a gate electrode extended from the gate line;
    a pixel electrode configured to include a pixel electrode lead portion connected to the drain electrode, a pixel electrode connection bar extended from the pixel electrode lead portion, and a plurality of pixel electrode protrusions extended from the pixel electrode connection bar;
    common lines arranged to be separated parallel to the gate lines; and
    a common electrode configured to include a common electrode connection bar connected to the common line, and a plurality of common electrode protrusions extended from the common electrode connection bar and arranged to alternate with the pixel electrode protrusions,
    wherein at least one of the first and second pixel regions is configured to include upper and lower portions,
    wherein the total number of the pixel electrode protrusions and the common electrode protrusions on the upper portion is different from that on the lower portion.

2. The liquid crystal display device claimed as claim 1, wherein the pixel electrode protrusions and the common electrode protrusions on the upper portion of the first pixel region are greater in number than those on the lower portion of the first pixel region.

3. The liquid crystal display device claimed as claim 1, wherein the pixel electrode protrusions and the common electrode protrusions on the lower portion of the second pixel region are greater in number than those on the upper portion of the second pixel region.

4. The liquid crystal display device claimed as claim 1, wherein the pixel electrode protrusions and the common electrode protrusions on the upper portion of the first pixel region are equal in number to those on the lower portion of the second pixel region.

5. The liquid crystal display device claimed as claim 1, wherein the pixel electrode protrusions and the common electrode protrusions on the lower portion of the first pixel region are equal in number to those on the upper portion of the second pixel region.

6. The liquid crystal display device claimed as claim 1, wherein the pixel electrode protrusions and the common electrode protrusions are arranged in different quantities on the upper and lower portions of the first pixel region.

7. The liquid crystal display device claimed as claim 1, wherein the pixel electrode protrusions and the common electrode protrusions are arranged in different quantities on the upper and lower portions of the second pixel region.

8. The liquid crystal display device claimed as claim 1, wherein the common electrode and the pixel electrode are arranged in the direction of the gate lines.

9. The liquid crystal display device claimed as claim 1, wherein first and second pixel regions are arranged in an alternating pattern.

* * * * *